United States Patent [19]

Matcovich et al.

[11] Patent Number: 5,056,783

[45] Date of Patent: Oct. 15, 1991

[54] SPORTS IMPLEMENT SWING ANALYZER

[75] Inventors: Robert R. Matcovich, King of Prussia; Thomas J. Matcovich, Maple Glen, both of Pa.; John J. Matcovich, Woodside, N.Y.; Kenneth W. Paist, Philadelphia, Pa.

[73] Assignee: Batronics, Inc., Maple Glen, Pa.

[21] Appl. No.: 423,780

[22] Filed: Oct. 18, 1989

[51] Int. Cl.$^5$ .............................................. A63B 69/00
[52] U.S. Cl. ................................................. 273/26 R
[58] Field of Search ................. 273/26 R, 26 B, 29 A, 273/72 R, 186 A, 183 D, 185 R

[56] References Cited

U.S. PATENT DOCUMENTS

| | | |
|---|---|---|
| 2,262,007 | 11/1941 | Kollsman . |
| 2,268,587 | 1/1942 | Guanella . |
| 2,580,151 | 12/1951 | Batchelder . |
| 2,991,339 | 7/1961 | Williams et al. . |
| 3,109,309 | 11/1963 | Luttrell . |
| 3,125,884 | 3/1964 | Davies . |
| 3,182,508 | 5/1965 | Varju ............................... 273/186 A |
| 3,270,564 | 9/1966 | Evans .............................. 273/186 A |
| 3,376,411 | 4/1968 | Montani et al. . |
| 3,566,348 | 2/1971 | Leyden et al. . |
| 3,717,857 | 2/1973 | Evans .............................. 273/186 A |
| 3,731,273 | 5/1973 | Hunt . |
| 3,772,800 | 11/1973 | Seze . |
| 3,786,792 | 1/1974 | Pelizzoni et al. . |
| 3,788,647 | 1/1974 | Evans .............................. 273/186 A |
| 3,792,863 | 2/1974 | Evans .............................. 273/186 A |
| 3,805,411 | 4/1974 | Andrews, Jr. . |
| 3,840,726 | 10/1974 | Harrison . |
| 3,945,646 | 3/1976 | Hammond ....................... 273/186 A |
| 4,055,830 | 10/1977 | Wilson et al. . |
| 4,056,850 | 11/1977 | Brown . |
| 4,088,324 | 5/1978 | Farmer ............................ 273/186 A |
| 4,136,387 | 1/1979 | Sullivan et al. ................. 273/186 A |
| 4,295,201 | 10/1981 | Wiklund . |
| 4,297,701 | 10/1981 | Henriques . |
| 4,331,425 | 5/1982 | Davis, Jr. . |
| 4,357,672 | 11/1982 | Howells et al. . |
| 4,370,724 | 1/1983 | Herbst et al. . |
| 4,377,850 | 3/1983 | Simpson . |
| 4,403,857 | 9/1983 | Holscher . |
| 4,408,288 | 10/1983 | Kondo et al. . |
| 4,506,336 | 3/1985 | Hird . |
| 4,561,064 | 12/1985 | Bruggen et al. . |
| 4,582,325 | 4/1986 | Yuhara . |
| 4,583,738 | 4/1986 | Fava . |
| 4,598,911 | 7/1986 | Lepera . |
| 4,732,744 | 3/1988 | Harrell, Jr. et al. . |
| 4,759,219 | 7/1988 | Cobb ................................. 273/26 R |
| 4,783,071 | 11/1988 | Tattershall . |
| 4,871,168 | 10/1989 | Autorino et al. ............... 273/186 A |

FOREIGN PATENT DOCUMENTS 2066676 7/1981 United Kingdom ........... 273/186 A

OTHER PUBLICATIONS

Kodak Ektapro 100 Motion Analyzer, Eastman Kodak Company, 1986 Kynar Piezo Film News (date unknown), p. 4.

Primary Examiner—Theatrice Brown
Attorney, Agent, or Firm—Ferrill and Logan

[57] ABSTRACT

A sports implement swing analyzer. The present invention comprises an implement having means for supporting acceleration measurement means; acceleration measurement means for measuring the acceleration of said implement through a swing for outputting a signal characteristic of said acceleration; means for transmitting said acceleration signal to a processing means; means responsive to said transmitting means for processing said acceleration signal according to a prestored algorithm and for translating said signal into an output characteristic of swing performance; and means for displaying said output characteristic of swing performance.

19 Claims, 18 Drawing Sheets

FIG. 3
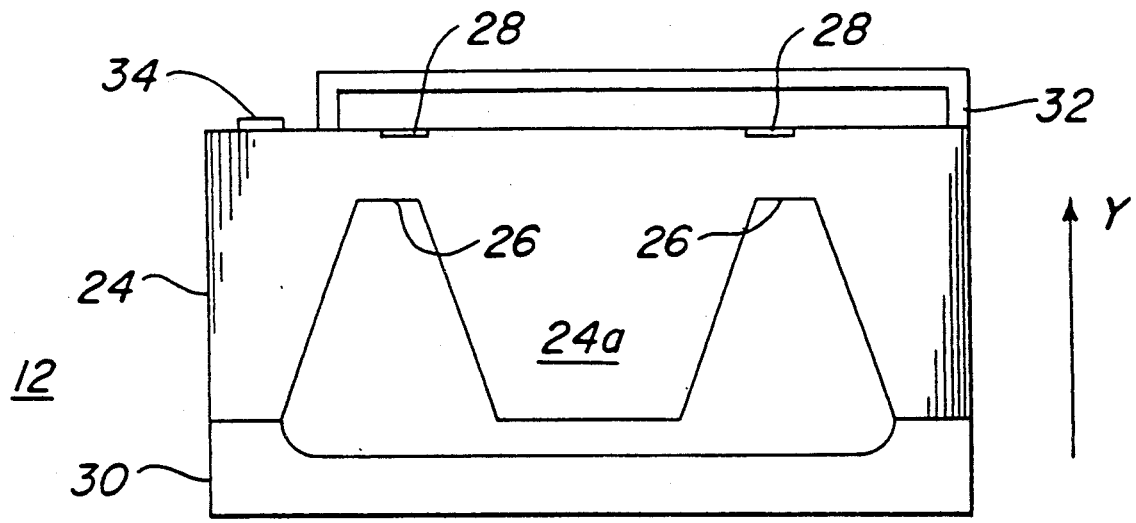
FIG. 4A
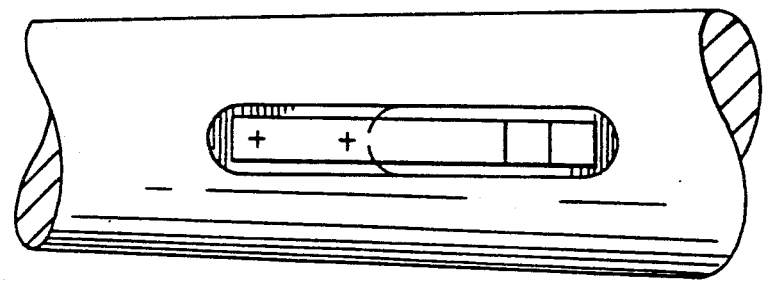
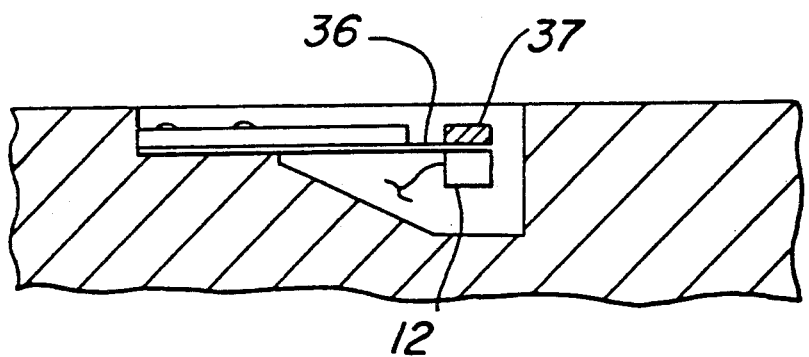
FIG. 4B

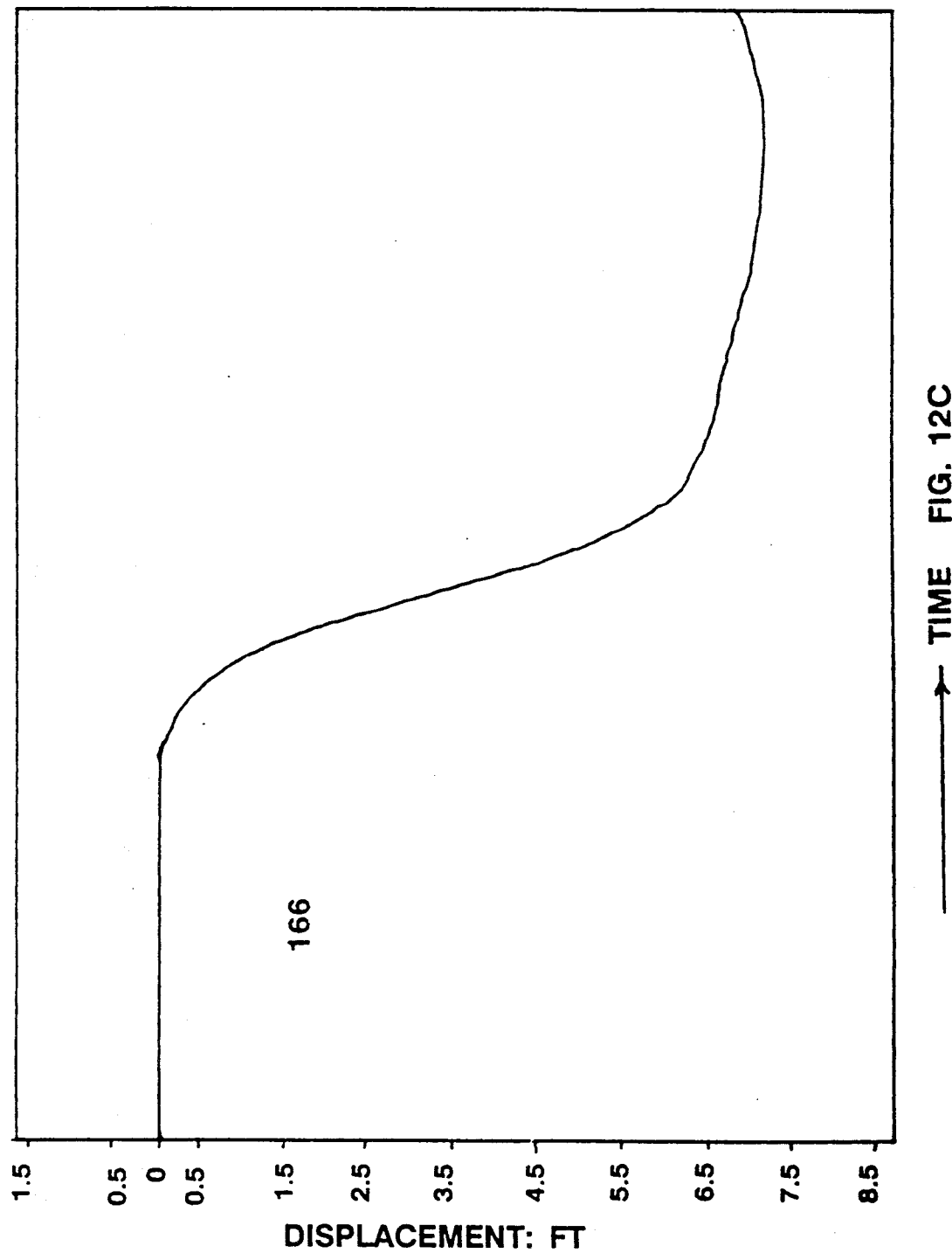

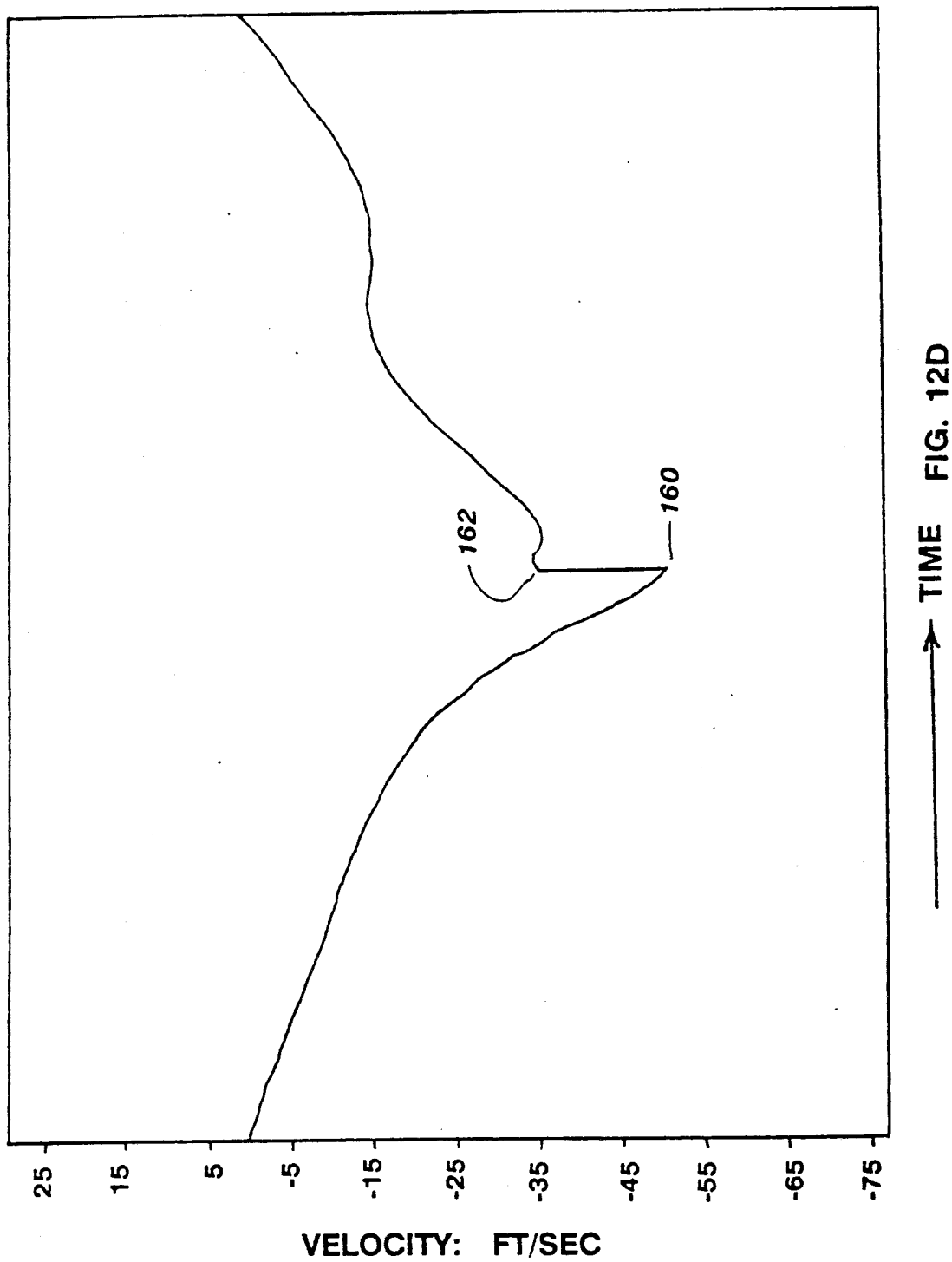

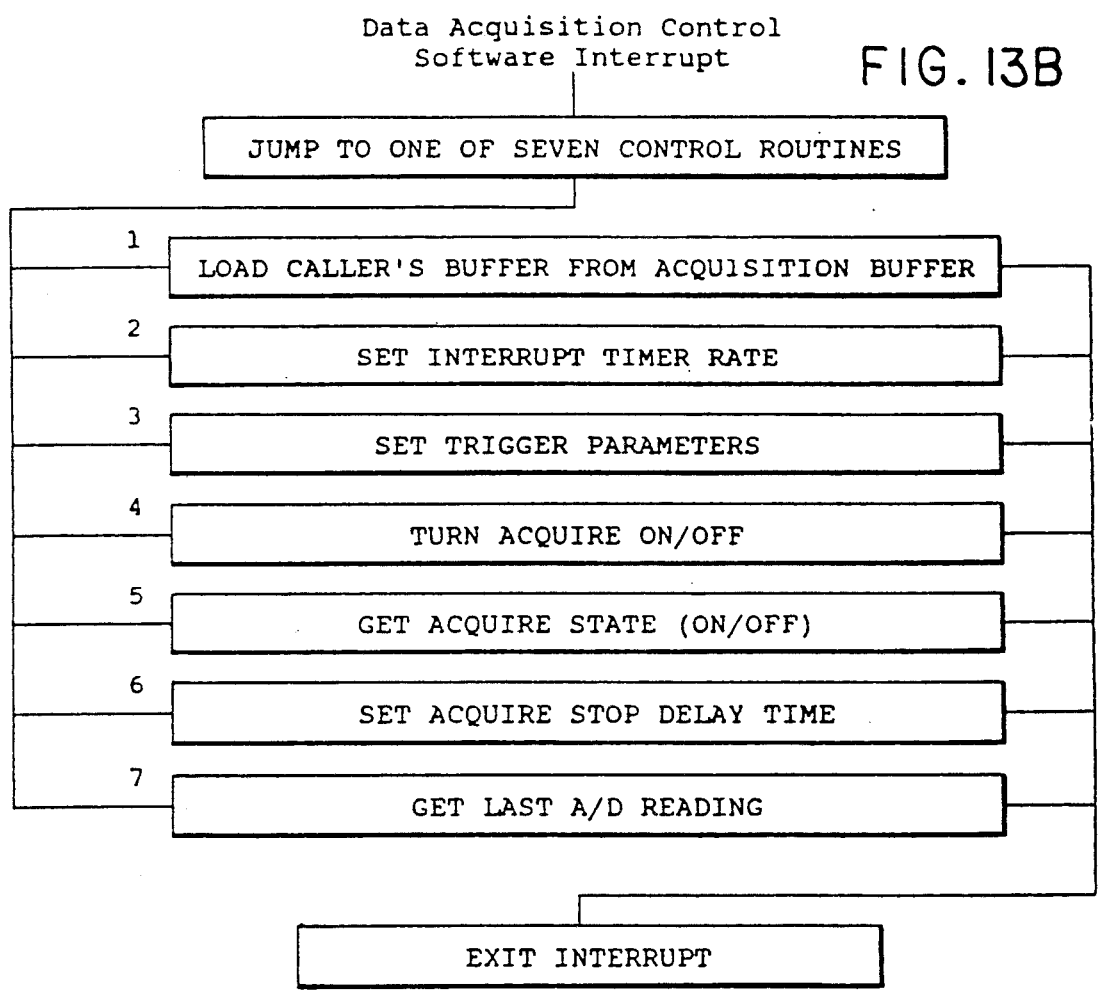

* see next page

SPORTS IMPLEMENT SWING ANALYZER

FIELD OF THE INVENTION

The present invention is directed to an apparatus for interpreting and diagnosing swing motion and impact force when a ball or object is struck by a swinging sporting implement such as a baseball bat or golf club. Specifically, the present invention is directed to an apparatus for determining the quality of the swing and impact force of a baseball bat, softball bat, golf club, hockey stick, tennis racquet, or implement used in other racquet and paddle sports.

BACKGROUND OF THE INVENTION

The present invention is directed to an apparatus for analyzing the motion, impulse and impact force when a ball is struck by a swinging sporting implement. Specifically, the present invention is directed to an apparatus and method of determining the quality of the swing impulse and impact force of a swinging baseball bat, golf club, tennis racquet and the like. The apparatus of the present invention processes data to indicate the quality of the swing and the impact force in order to diagnose problems and provide guidance for improving swing quality and to maximize impulse and impact force.

There are a number of prior art devices which have been developed to analyze swing quality in sports such as golf and tennis. Typically, these prior art devices and methods have been generally applied to golfing. Several diagnostic systems are available for analyzing a golf swing. In the more recent of these devices, club position is sensed by use of a light source and multiple numbers of light sensors An example of such a device is manufactured by Sports Technology of Essex, Conn. This apparatus can be used when the position of the ball is fixed and the point of impact is known. The device provides data on the average velocity of the swing in the vicinity of the contact point, the direction of the swing, and the club face angle. The device utilizes a significant amount of hardware, requires installation time, and is affected by the level of ambient lighting. Further, the apparatus cannot be used if the ball position is not fixed, as is the case when a baseball or tennis ball is struck. Finally, the device does not provide continuous data on the motion of the club.

Another type of prior art apparatus for measuring bat motion utilizes high speed photography. These methods require sophisticated and expensive equipment and do not provide instantaneous results. An additional type of prior art apparatus utilizes high speed video photography to measure bat position as a function of time. An example of such an apparatus is the Kodak Ektapro 1000 motion analyzer. The positional data obtained from this apparatus can be processed to provide velocity and acceleration data. However, the use of high speed video photography is expensive and requires trained personnel.

Further types of diagnostic or instructional aid devices utilize a modified club, or require the addition of belts and harnesses. Examples of such devices are disclosed in U.S. Pat. Nos. 4,582,325 and 4,598,911. These devices are cumbersome and by their very nature, do not replicate the motion of a real bat or club.

A device which utilizes an accelerometer is disclosed in U.S. Pat. No. 4,088,324. In this apparatus, the accelerometer output is processed and displayed by means of circuits built into a golf club. Only a suitably modified golf club can be used for tests. The device disclosed in this patent also focuses on the peak value of the acceleration, and this value is used to predict the distance the ball would travel.

The present invention is directed toward improving over the prior art devices, and provides a significant leap toward providing identifiable and empirically testable swing parameters. With the apparatus of the present invention, an accelerometer is mounted on the bat, racquet or other swingable sports implement. A suitable commercially available sensor as small as 0.14-by-0.14-by-0.27 inch in size may be utilized. The signal from the accelerometer is transmitted to an electronic processor via wires, or, alteratively, via an rf signal. In the latter case, an rf transmitter is built into the sensor installation mounted on the bat. The data processed produces various outputs which are useful in analyzing the swing and impact force. These include peak velocity, peak acceleration, impulse magnitude, duration of contact, time of contact (with respect to peak velocity), velocity as a function of time and the displacement as a function of time. These data are available as digital and graphic output in less than one minute from the completion of the swing. The apparatus can be housed in a cabinet the size of a typical lap-top computer which weighs less than 15 pounds. The apparatus may be battery operated and thus is easily transportable As a diagnostic tool, the apparatus can be used to characterize a batter's swing when he or she is hitting well, and then compared to his or her swing when he or she is not hitting well. A comparison of these data could indicate the difference in the swing and the interpretation of the differences could be used to correct the swing. Alternatively, the swing of any batter could be characterized and constructive changes in his swing proposed based upon the interpretation of these data. With the addition of velocity measurement equipment, the batter's contribution to the mass of the system can be determined.

The present application further discloses a bat or implement swing machine. The machine makes it possible to reproducibly strike a ball or object with a bat in a predetermined manner. This machine helps calibrate the analyzing apparatus, perform test studies, study the effect of impact location on batting effectiveness, and study the effect of transducer or acceleometer placement on sensor readout.

In view of the above, it is a object of the present invention to provide an apparatus which can translate swing acceleration into a plurality of swing performance parameters which can be utilized for instructional or diagnostic purposes.

It is a further object of the present invention to provide an apparatus which produces a unique swing signature which can be analyzed and utilized for instructional and diagnostic purposes.

It is still a further object of the present invention to provide a universal sensor which can easily be used interchangeably on a variety of sports implements.

It is still a further object of the present invention to provide a swing analyzer which can transmit acceleration data either through a hard-wired coupling or via an rf transmitter.

It is yet a further object of the present invention to provide a swing analyzer which, when utilized in conjunction with speed measuring apparatus, can be utilized to calculate the contribution of the player to the effective mass of the system.

It is still a further object of the present invention to provide an apparatus which can reproducibly strike a ball with an implement in a predetermined manner in order to calibrate the analyzer, perform studies and tests, and test accelerometer wear.

SUMMARY OF THE INVENTION

In accordance with the present invention, a sports implement swing analyzer comprising: a sports implement having means for supporting acceleration measurement means; acceleration measurement means for measuring the acceleration of said implement through a swing and for outputting a signal characteristic of said acceleration; means for transmitting said acceleration output signal to a processing means; means responsive to said transmitting means for processing said acceleration signal according to a prestored algorithm and for translating said signal into an output characteristic of swing performance; and means for displaying said output characteristic of swing performance.

BRIEF DESCRIPTION OF THE DRAWINGS

The foregoing summary as well as the following detailed description will be better understood when read in conjunction with the drawings appended hereto. For the purpose of illustrating the invention, there is shown in the drawings an embodiment which is presently preferred, it being understood, however, that this invention is not limited to the precise arrangement and instrumentalities shown.

FIG. 3 is a section view of a piezoresistive accelerometer which may be utilized in the present invention.

FIGS. 4A and 4B illustrate a cantilever spring placement embodiment for the accelerometer of the present invention.

FIGS. 12A-12D illustrate a set of swing parameter curves which may be generated by the present invention.

FIGS. 13A-13F illustrate the algorithmic flow charts associated with the computer program utilized with the present invention for translating data generated by the bat to the curves shown in FIGS. 12A-12D.

DETAILED DESCRIPTION OF THE INVENTION

Figure 1:
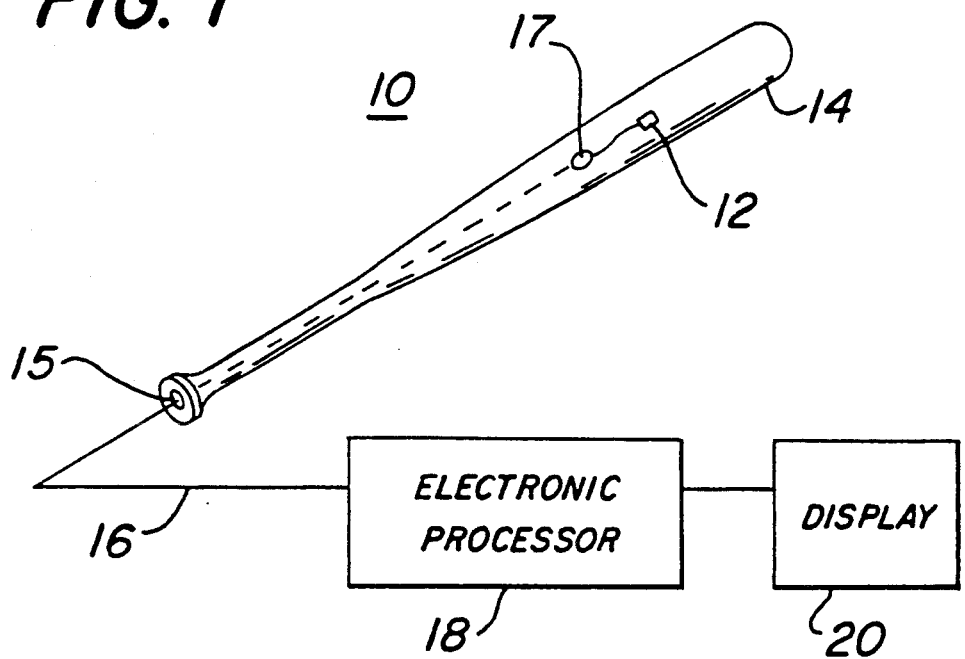
FIG. 1 is a flow chart representation of a baseball bat accelerometer utilizing a hard-wire transmission mechanism.

The present invention is described with reference to the enclosed FIGS. wherein the same numbers are utilized where applicable. The apparatus for a typical hard-wired baseball 10 or softball application is shown in FIG. 1. As shown, an accelerometer 12 is mounted on the bat 14 by one of the several mounting means to be described in greater detail below. The bat 14 may be constructed from either wood or metal. In the hard-wired version, typically four wires 16 will be extend down to the bat handle and must be suitably attached to the bat. The wires 16 connect the accelerometer 12 to the electronic processor 18 via relief strains 15, 17. The wires 16 transmit power to the accelerometer 12 and transmit analog signals from the accelerometer to the electronic processing equipment 18. The analog signals will be digitized by means of an A/D converter, stored in a buffered memory and operated upon by a pre-programmed computer. In operation, the computer stores the data, calculates the various swing parameters, and displays 20 the data in digital and graphic form, and may further provide means for obtaining a hard copy readout of the data.

Figure 2:
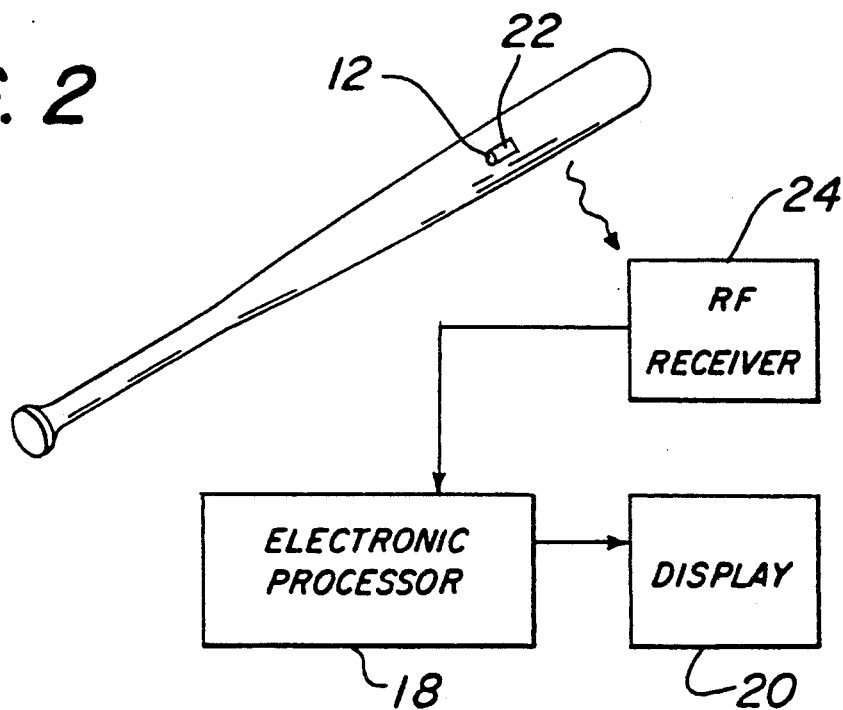
FIG. 2 is a flow chart representation of a baseball bat accelerometer of the present invention which utilizes an rf transmitter and receiver configuration.

In the rf configuration shown in FIG. 2, the rf transmitter 22 is included in the sensor package mounted on the bat and an rf receiver 24 is utilized at the processing station to receive the transmitted data. These data are demodulated and fed into an A/D converter to be processed as in the hard-wired embodiment. The rf transmitter 22 is battery operated and modulated by the sensor output. Those data could be digitized on the bat, but it is recommended that these data be digitized at the signal processor to minimize the electronics on the bat. The bat mounted electronics and sensor will be subjected to very high g forces and special care needs to be taken in both their selection and packaging. By using modern fabrication techniques, it is possible to package the sensor and electronics in a package as small as a half-inch diameter, ⅜ inch high pill box.

Several commercially available accelerometers may be utilized in the present invention. The preferred type is a solid state piezoresistive accelerometer which is available from several manufacturers. A cross section of such a unit is shown in FIG. 3. The accelerometer 12 comprises a frame 24 of silicon which is chemically micromilled using processes developed for the manufacture of integrated circuits. Frame 24 provides a mass 24a which is supported by cantilever arms 26. Piezoresistive resistors 28 are diffused into the cantilever arms as shown in FIG. 3. The frame 24 is mounted on base 30 which is also micromachined from silicon. The base 30 limits the motion of the mass to protect the unit from excess g forces and provides the bottom side of the package. The cap 32, which is also micromachined from silicon, is attached to the top side of the frame and provides air dampening for the unit as well as completing the package. Connection to the external circuitry is made via bonding pads 34.

When the bat is accelerated in the Y direction, the mass 24a moves relative to the frame 24 causing the cantilever arms 26 to bend and the resistor values 28 to change. The resistors 28 are connected to form a Wheatstone bridge, and when a dc supply voltage is supplied, an output voltage is obtained which is proportional to the acceleration.

The accelerometer can be fabricated using the batch fabrication processes presently used in integrated circuit manufacturing and consequently the cost per unit is low, the size is small, and reproducibility is good. The units are available in a number of packages including a surface mount configuration and may also be used directly in their primary package configuration.

The g force magnitudes observed during a bat or golf swing are in the plus-or-minus 10 g range [one (1) g equals the acceleration of gravity or 9.8 m/s$^2$]. At impact, the force may exceed several thousand gs. Commercially available accelerometers have operative ranges from $+/-2$ to $+/-5000$ gs. The g forces associated with the swing can not be measured accurately with a high g accelerometer needed to measure the impact force, and the impact force cannot be measured on the low g accelerometer needed to measure the swing forces. In addition, the low g accelerometer must be able to sustain the high g impact forces. Consequently, it may be necessary to use two accelerometers in order to characterize both the swing and the impact. Further, to obtain an accurate reading, the high g accelerometer must be rigidly attached to the bat. This can be accomplished by use of a hard epoxy or a cyanoacrylate-base cement. In the latter case, the unit could easily be removed for replacement by dissolving the cement in acetone.

There is a benefit to using a soft mount for the low g force accelerometer. As will be discussed herein, a typical swing takes approximately ½ second while the impact is less than 10 milliseconds in duration. Consequently, if the low g accelerometer is mounted via a low pass mechanical filter, it can read the low g forces with accuracy while not being exposed to the high g impact forces. This technique can extend the life of the low g accelerometer with all the concurrent advantages.

The soft mount (which functions as a low pass filter) can be accomplished by mounting the accelerometer with an RTV compound. The resonant frequency can be changed by varying the thickness of the RTV layer. Alternatively, the unit can be hard mounted on a cantilever spring 36 as shown in FIG. 4. In this configuration the resonant frequency could change by varying a mass 37 on the end of the spring. This could be a simpler operation than changing the thickness of the RTV layer.

Although the methods of attachment described above are the simplest, they may not be the most useful. This would be particularly true if an rf transmitter is included in the accelerometer package In this case it would be necessary to have easy and frequent access to the battery which powers the unit. A more flexible configuration is shown in FIG. 5.

Figure 5:
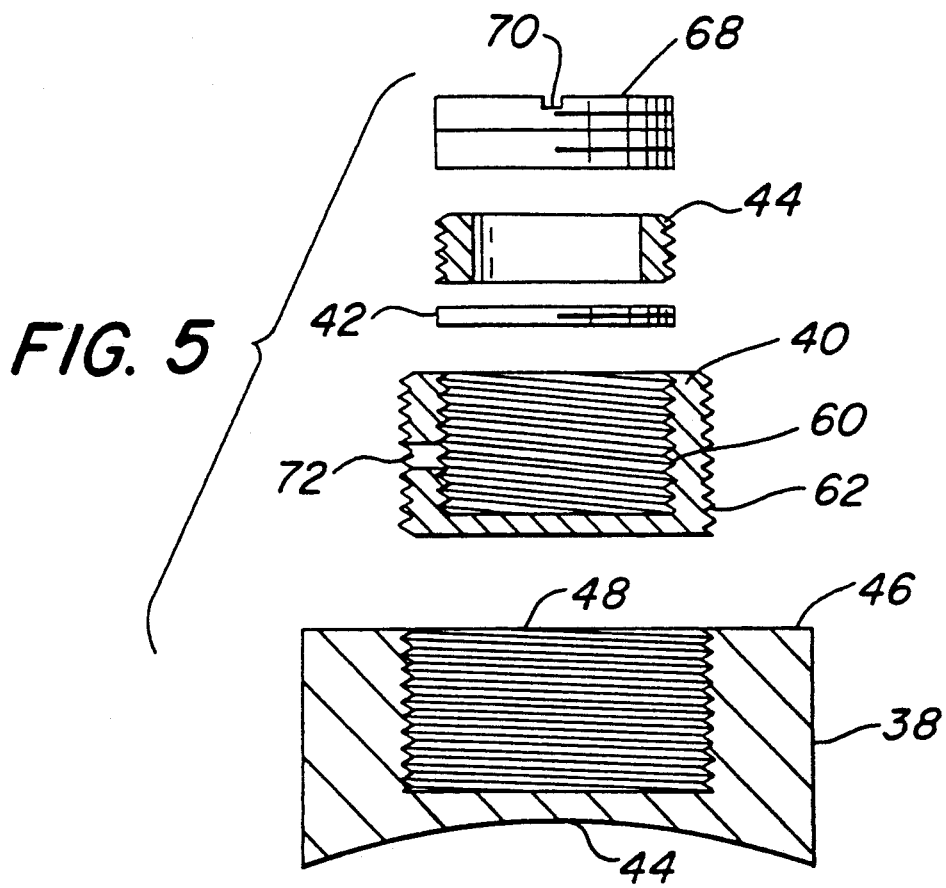
FIGS. 5 and 6 illustrate a placement package for an accelerometer utilizing the rf transmitter configuration of the present invention.

The mount shown in FIG. 5 comprises a fixture 38, a circuit package 40, and, optionally, a retainer ring 42 and cap 44. The fixture 38 can be constructed from any rigid material such as aluminum or plastic. The lower surface 44 is contoured to fit the bat, golf club, or tennis racquet. The fixture 38 is attached to the bat by use of velcro, double sided tape, epoxy or other adhesive or by screws. If velcro or tape is used, the accelerometer can quickly and easily be moved between several bats so that swings with different bats can be compared. The upper surface 46 of the fixture 38 is flat and generally parallel to the tangent at the center of the contour. A threaded hole 48 is provided in the top (flat) surface 46 of such size as to fit the circuit package 40. The circuit package 40 is pill box shaped and threaded on the inside 60 and outside 62. The inside thread 60 is optional.

The substrate 64 which holds one or more accelerometers and the rf circuitry, if used, is placed in the circuit package and held in place by a retaining ring 42. A cap 68 may be screwed in on top of the ring to provide added protection. This cap could contain a slot 70 so that a coin or a screw driver could be used to fix it in place. If a hard-wired system is used, a hole 72 is provided in one of the package surfaces so that wires can be taken out through hole 72, or alternatively, through the top. The circuit package may be filled with potting compound, in this case, the retaining ring and cap need not be used. The advantages of this attachment method is that the circuit package can easily be replaced and a universal circuit package or module could be designed to fit various shaped bats, racquets or clubs.

Figure 6:
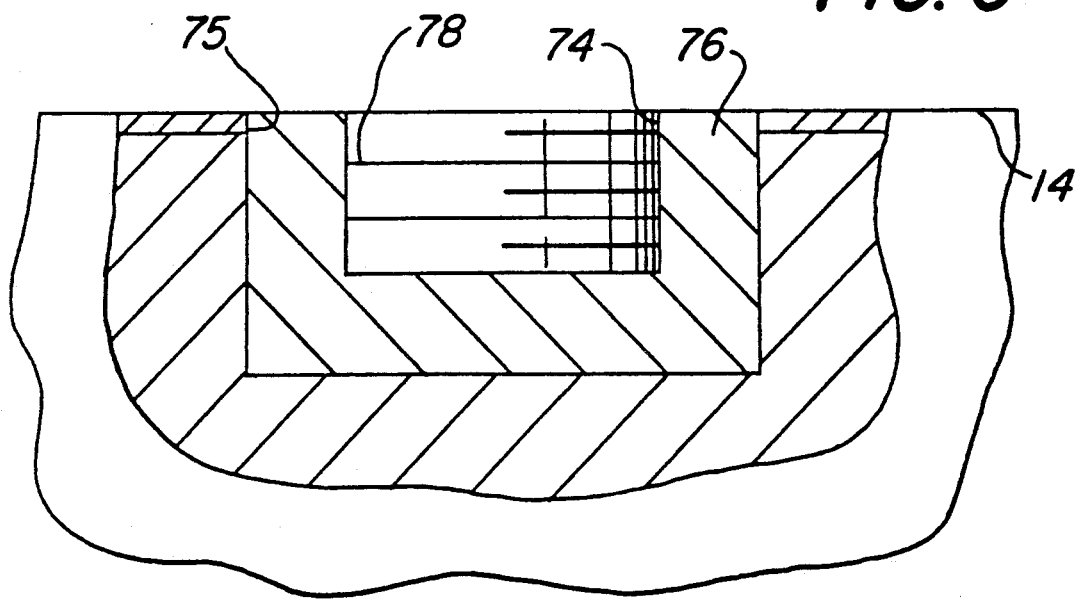

Alternatively, the fixture 38 could be eliminated and replaced with a threaded hole 75 provided directly in the bat to accept the circuit module. If the bat is constructed from wood, the hole may be deep enough so that the entire circuit module can be placed below the bat surface. If the bat is constructed from metal (i.e. hollow), a cup 76 could be inserted into the bat as shown in FIG. 6. In this FIG., the bat 14 contains a hole 75 into which cup 76 is fitted. The cup 76 may be attached by threads, glue or solder or welding. The inner surface of the cup 76 is threaded 78 to accept the circuit package.

Figure 7:
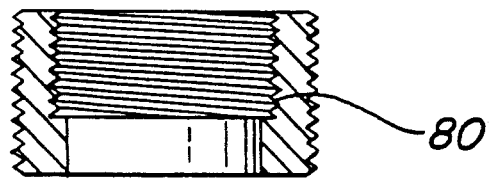
FIG. 7 illustrates an rf transmission system to be utilized with the present invention which permits easy replacement of the battery.
Figure 8:
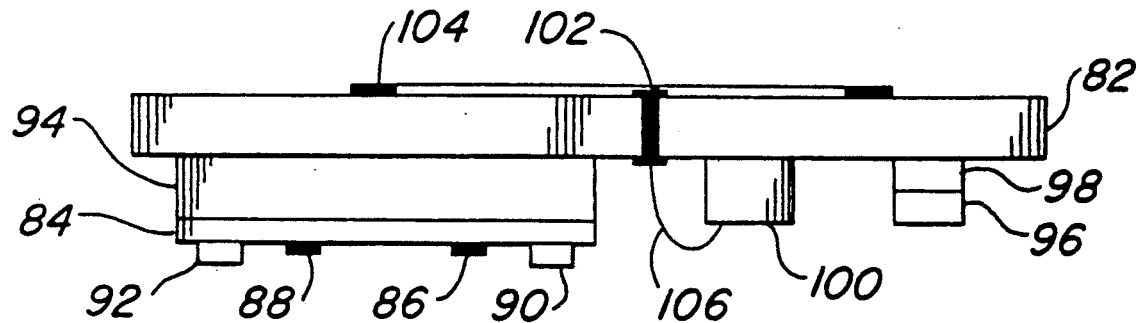
FIG. 8 illustrates a accelerometer substrate to be utilized in the present invention

In the rf transmission embodiment, provision must be made to allow easy replacement of the battery. This can be accomplished by using the configuration shown in FIG. 7. The circuit package 40 is similar to that described in FIG. 5 except the inner thread 60 only goes partly down into the hole leaving a stop 80 on which the circuit substrate 82 will be supported. The substrate 82 shown in FIG. 8 may constructed from ceramic as is typically used in thick-film circuits. The circuit board 84 may be constructed from PC board or ceramic. In the latter case, the board 84 will contain printed conductors 86, printed resistors 88, IC circuits in chip form 90 and other discrete components 92. The board is attached to the substrate by a resilient mount 94 to isolate it from the high g forces. The low g accelerometer 96 is mounted to the substrate by a resilient mount 98 designed to function as a low pass mechanical filter A high g accelerometer 100, if required, is rigidly bonded to the substrate. Two battery contacts are bought to the top surface: one is a point contact 102 in the center of the substrate; and the other a ring contact 104 centered on the point contact. The components are interconnected by wire bonds 106, where necessary. The substrate 82 is placed component-side-down into the circuit package shown in FIG. 7. Restraining ring 42, previously identified, is screwed in on top of the substrate 82 to rigidly hold the substrate to the package.

Figure 9:
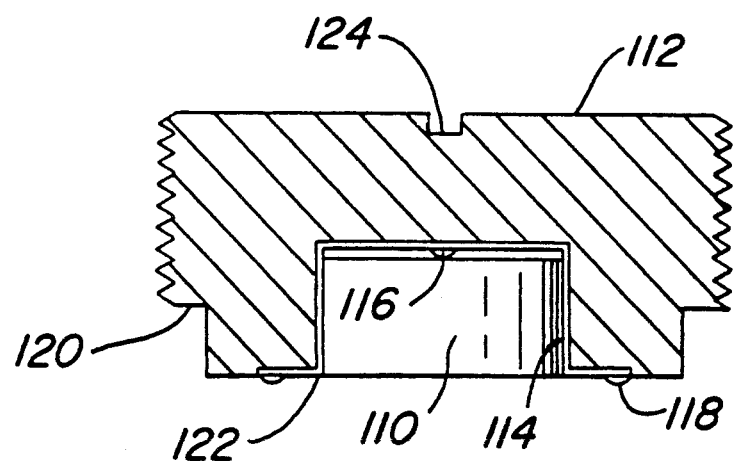
FIG. 9 illustrates the battery placement configuration for the rf transmitter configuration of the present invention.

The battery 110 is contained in the battery plug 112 shown in FIG. 9. The outside of the plug 112 is threaded to fit into the circuit package. The plug material is electrically insulating. A conductor 114 connects battery contact 116 to ring contact 118. A notch 120 is cut into the plug to provide clearance for the restraining ring. The battery 110 is placed in the battery cavity 122. A slot 124 is provided in the top of the plug for easy insertion and removal. The battery plug 112 is screwed into the circuit package 40 providing electrical power to the module and mechanical protection to the electronics. The plug also acts as a switch and would be removed when the unit was not to be used for extended periods of time.

Because the rf embodiment needs to be battery powered, some means must be provided to disconnect the battery when not in use. One technique was described in the paragraph above. If this technique is not used, a simple mechanical switch could be added. Alternatively, a mercury switch could be used. The switch would be arranged to be open when the bat was vertical (storage position) and closed when the bat was tilted. An electronic circuit would be used to hold the battery circuit on for a specified length of time after every closed circuit signal received via the mercury switch. This would keep the unit from turning off if the bat were inadvertently held in the vertical position during use.

Figure 10:
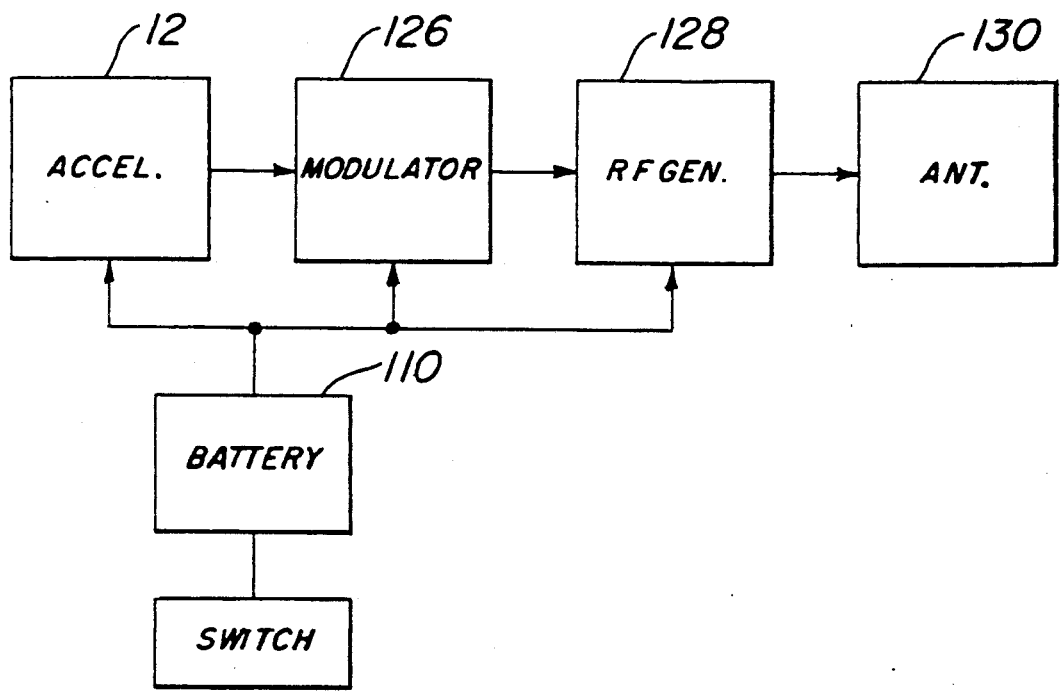
FIG. 10 is a flow chart for the circuitry utilized on the bat for the rf transmitter embodiment of the present invention.

The circuitry needed on the bat for the rf configuration is shown in FIG. 10. The accelerometer 12 output feeds to modulator 126 which modulates the rf signal generated by rf generator 128. The modulated rf signal is then transmitted via antenna 130. If a metal bat is used, the bat itself could serve as the antenna. Modulation may be AM, FM or Pulse. Power is supplied by battery 110 which is fitted with a switch as previously discussed.

Figure 11:
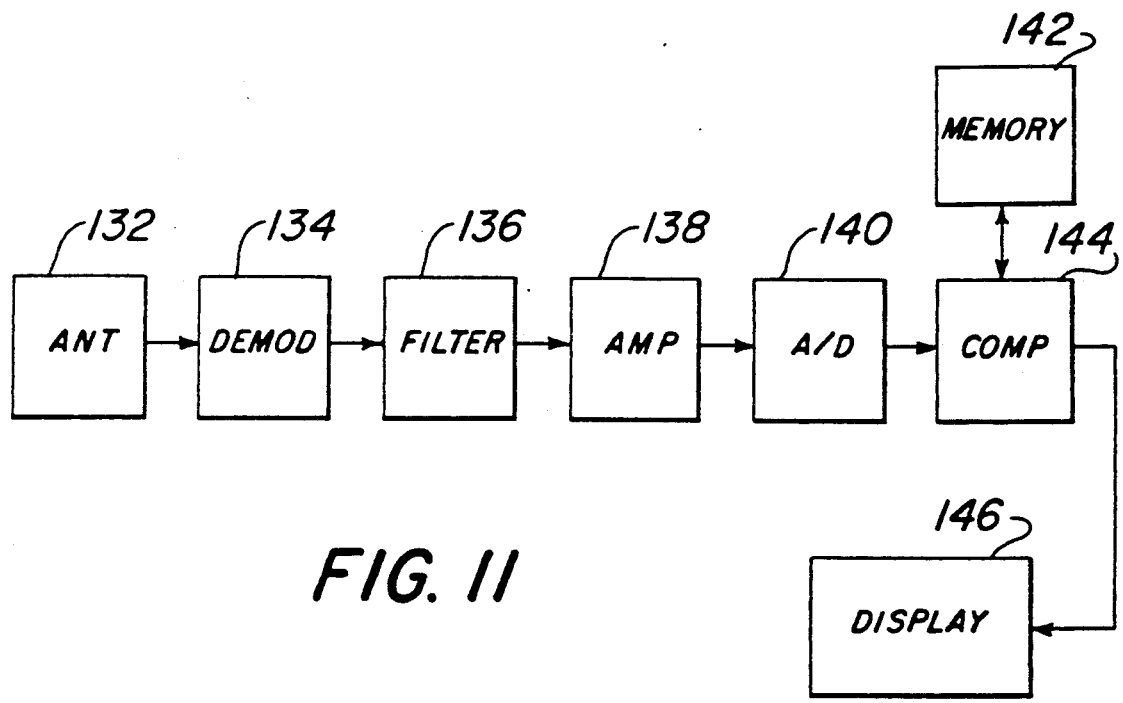
FIG. 11 illustrates the circuitry of the electronic processing unit utilized in the present invention.

The circuitry in the electronic processing unit is shown in FIG. 11. In the rf configuration, the transmitted rf signal is detected by receiving antenna 132 and demodulated by demodulator 134. The demodulated analog signal is passed through low pass filter 136 to prevent aliasing and then amplified to the desired level by amplifier 138. The amplified signal then goes to 8 or 12 bit A/D converter 140 and the digitized output from the converter 140 is stored in a buffered memory 142. When the magnitude of the input data exceeds a (preset) trigger level, the computer 144 captures a set of swing data in the buffer comprising a (preset) number of data points before and after the trigger time. These data are integrated twice providing the acceleration, velocity and displacement of the swing as a function of time. These graphic data as well as discrete values derived from these data are sent to the display unit 146 for presentation to the operator. The contents of buffered memory 142 may be stored on a floppy disk, and the processed data may be printed out as hard copy.

In the hard wired configuration of FIG. 1, the accelerometer signal is carried by two wires to the amplifier and subsequently processed in the same manner. Two additional wires are used to carry a DC power supply voltage from the processing unit to the accelerometer. The four wires are carried in a single cable running from the accelerometer to the processor.

The accelerometer measures the acceleration along a line perpendicular to the sensing mass. In general, this is not sufficient to completely specify the motion of the bat. Three mutually perpendicular accelerometers could be used and this data could be combined to give a more complete description of bat motion.

It is to be appreciated that the purpose of the present invention is not to describe the precise motion of the bat. Rather, the purpose is to provide an output which characterizes the swing and relates specific features of the output to the mechanics of the swing. This can be accomplished with a single accelerometer, although two accelerometers may be needed to cover the g force range as previously discussed. If the bat is swung in a plane parallel to the ground, and the sensitive axis of the accelerometer is held perpendicular to the earth's gravitational field throughout the swing, the output can be given a simple physical interpretation. The accelerometer will follow a path in the plane of the swing. The accelerometer output will be the acceleration tangential to this path, the time integral of this acceleration will be the velocity tangential to the path, and the time integral of the velocity will be the displacement along the path. The path in general will not be circular since the motion includes the motion of the batter as well as the bat.

A set of curves taken under the conditions specified above are shown in FIGS. 12A–12D. Negative valves of acceleration in curve 148 correspond to a swing in the forward direction. The acceleration during the part of the swing not effected by the impact 150 varies smoothly and does not exceed +/−10 gs. At impact, the g forces are large and can exceed thousands of gs. The maximum g force 152 varies over a large range and is one of the derived measured parameters. The impact time 154 is generally less than 10 milliseconds and varies considerably and is another of the measured parameters. The integral of the acceleration over the impact time (the area under the first acceleration spike) when multiplied by the effective mass of the bat-batter system is the impulse applied to the ball. This is equal to the change in momentum of the ball and is a direct measure of the velocity with which the ball leaves the bat. Consequently, this value is a measure of the effectiveness of the bat swing and is one of the parameters derived from the data In some cases, there is a post impact oscillation in the acceleration curve 156. This is apparently caused by vibration of the bat. The data shown are for a metal bat; larger oscillations of longer duration are seen when wooden bats are used.

Figure 12A:
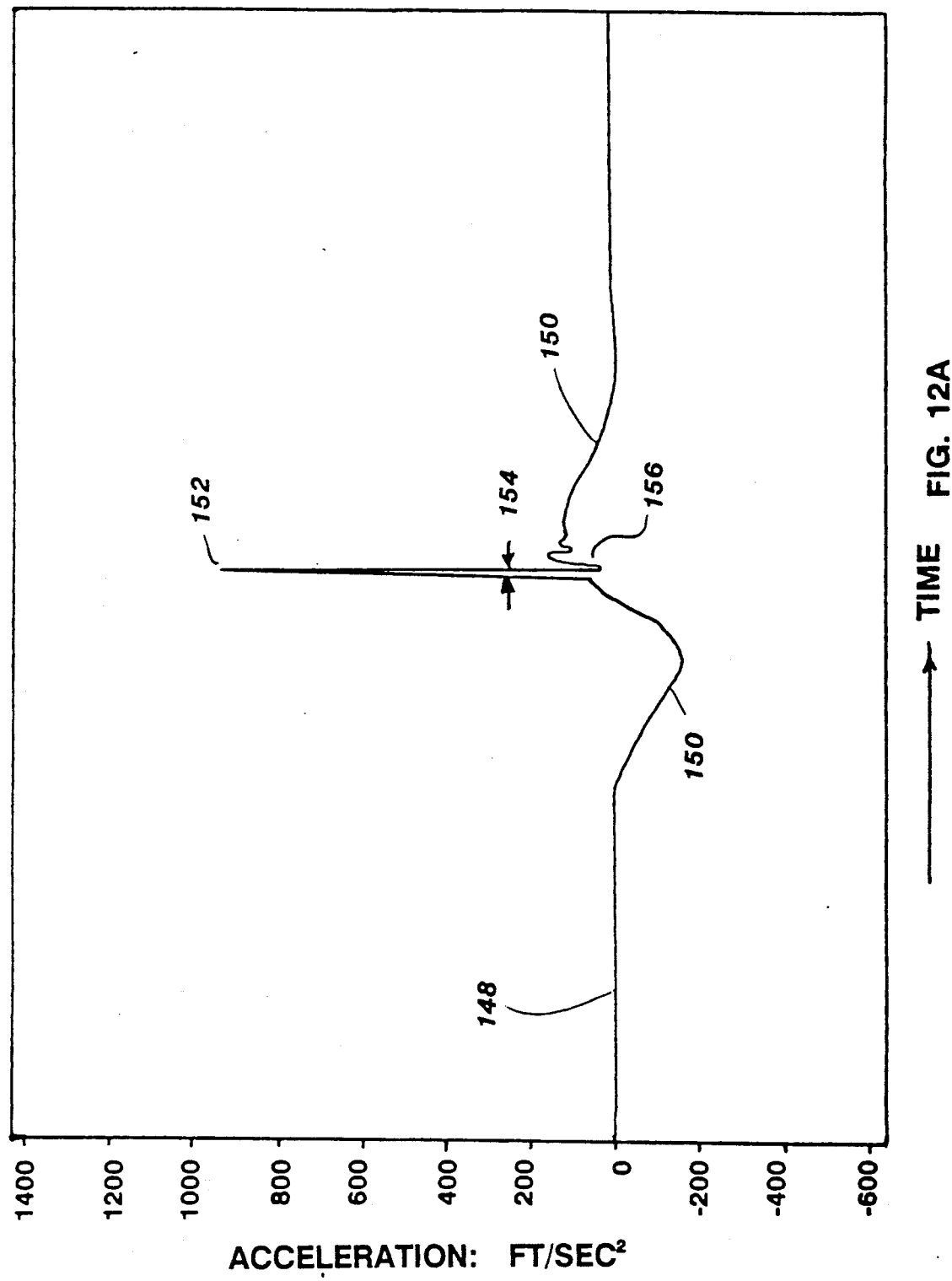
Figure 12B:
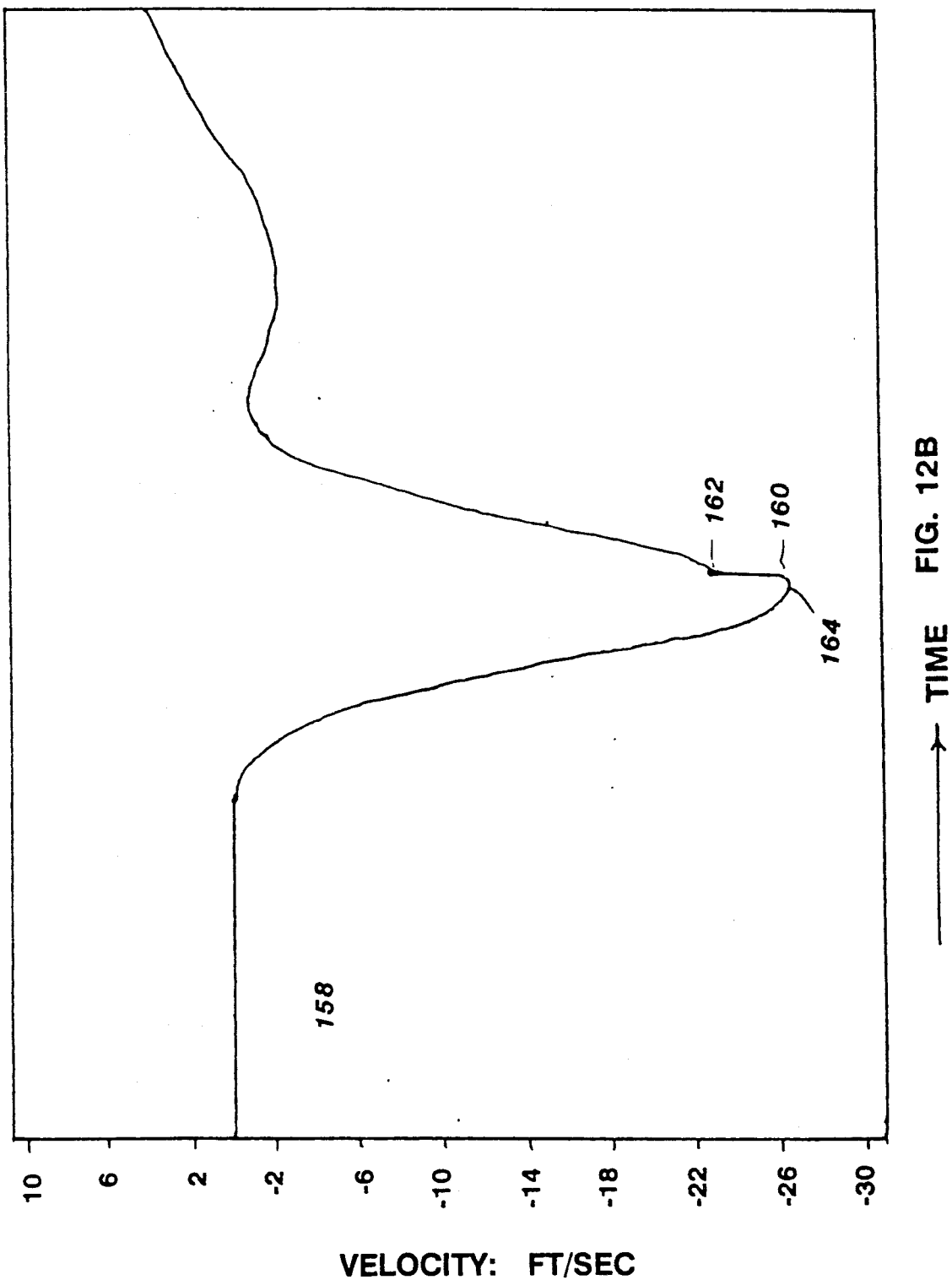

The velocity curve 158 in FIG. 12B also shows reproducible features. The sharp break in the curve corresponds to the impact. The time from points 160 to 162 is the impact time and the velocity change from 160 to 162 corresponds to the area under the acceleration impact spike. The points 160 and 162 are more clearly shown in FIG. 12D which is a velocity curve for a case in which the ball is struck before the anticipated velocity peak is reached. Both of these data are obtainable from the acceleration curve. However, the velocity curve clearly shows the time of impact with respect to the time of maximum velocity 164. The impact can occur before, after or exactly at 164; the ideal time would be at 164 when the bat velocity is greatest. The timing of the impact can be changed by having the batter change his stance in the batter's box. If impact occurs before maximum velocity, the maximum velocity is not known. The relative timing of the impact can be determined by measuring the slope of the velocity curve at impact. A negative value indicates impact was too soon, a positive value indicates impact was too late and a zero value indicates optimum timing. The slope is simply the instantaneous value of the acceleration at impact time and is easily available. This is another parameter derived from these data. Finally, the displacement curve 166 in FIG. 12 shows a reasonable shape and no outstanding features.

The accelerometers have a zero g offset voltage which must be subtracted from the output to get an accurate reading. The offset voltage will vary with temperature and aging. Temperature compensation circuits are frequently used with accelerometers. In this application, the offset voltage is measured at the beginning of each data set. This obviates the need for compensation not only for temperature but also for aging. The offset voltage is determined by averaging the velocity (or acceleration) over the first several (e.g. 100) data samples and requiring that the average value equal zero. For the swing specified above (in one plane), this is equivalent to setting the final velocity equal to zero (the offset is adjusted to make the integral of the acceleration over the entire time period equal to zero) and is totally consistent with the physics and the experimental data.

The curves shown in FIG. 12 have reasonably physical interpretation and are reproducible. However, a normal swing is not in a single plane and the orientation of the accelerometer with respect to the earth's gravitational field and the direction of motion changes during the swing. The accelerometer measures some part of the earth's field when its sensitive axis is not perpendicular to the field and this input is added to the accelerometer output due to the bat motion. If the sensitive axis of the accelerometer is not parallel to the direction of motion it measures only part of the acceleration in the direction of motion. These considerations make it questionable as to whether a reasonable interpretation can be given to the data taken for a normal swing. Experiments have shown that the features described for the planer curve are seen in the normal swing curves and are quite similar until after impact. Experiments were performed with a modified planar swing in which the bat was deliberately rotated after impact. The velocity curves after impact were displaced upward or downward depending on the direction of bat rotation. This data suggests that the post impact shape of the velocity curve can provide data on bat rotation and probably distinguish between topping and undercutting a ball. The post impact change in velocity can be very large and precludes the use of final velocity equal to zero as a criteria for setting the offset voltage.

The use of the zero initial velocity criteria for setting the offset voltage is also flawed by the addition of some of the earth's gravitational field in the accelerometer data. Experiments have shown the results to be insensitive to this error and consequently this criteria for setting offset voltage is used in this invention.

In practice, the batter is instructed to hold the bat so that the accelerometer is on the opposite side of the bat from the ball when the ball is struck. In addition the batter is asked to hold the bat still for a second prior to swinging in order to establish the zero velocity condition. With these conditions met, the apparatus provides data which characterize the batter's swing and presents details which may be used to instruct the batter to improve his swing.

Figure 13A:
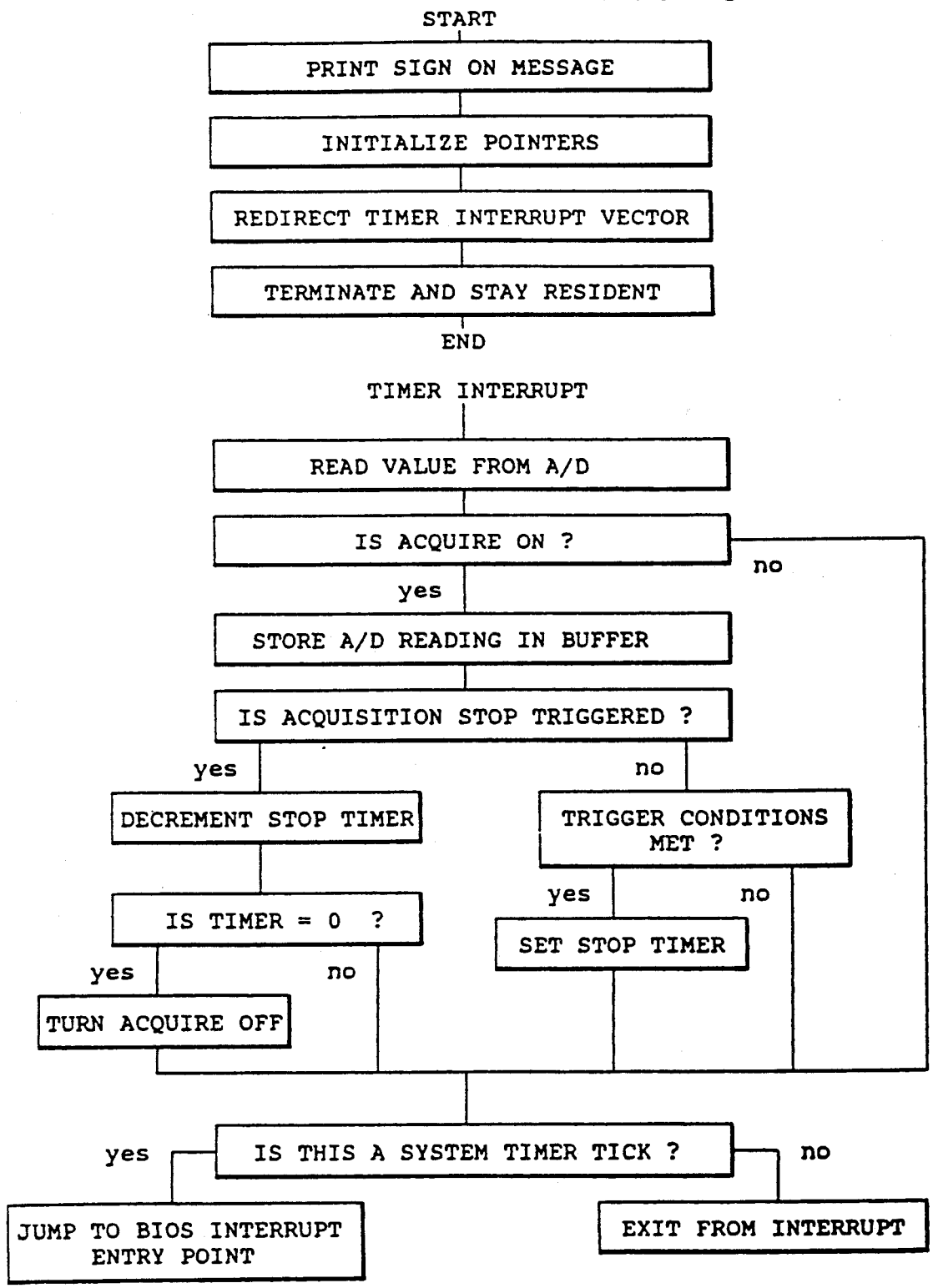
Figure 13C:
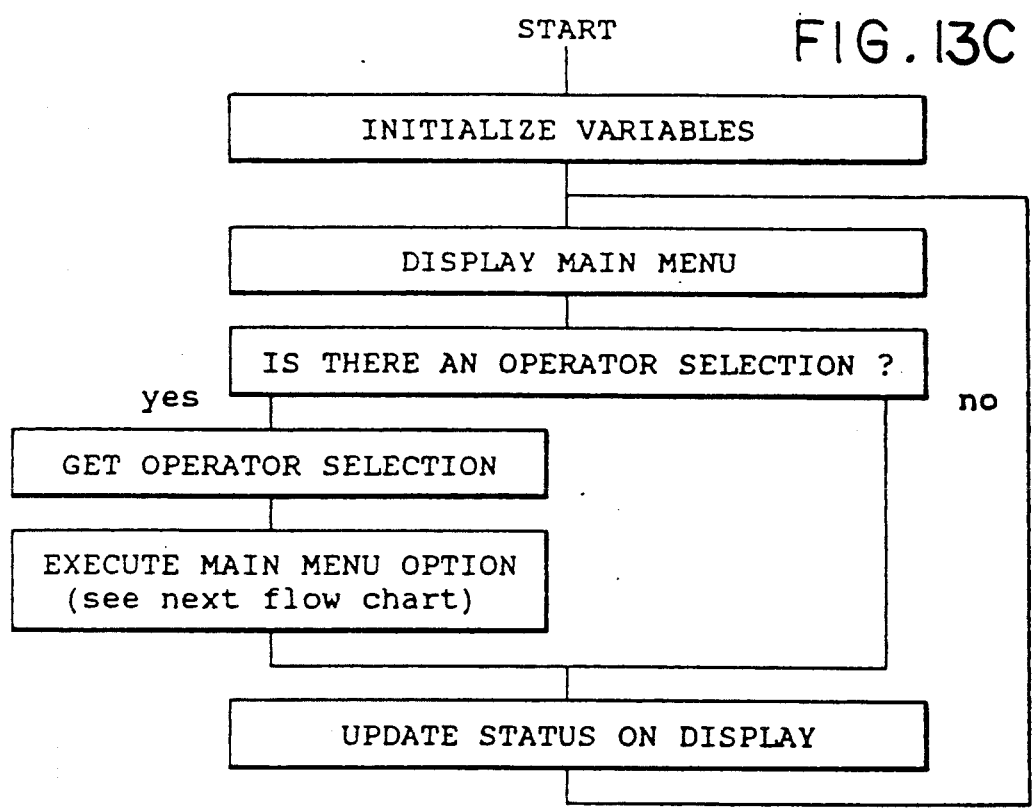
Figure 13D:
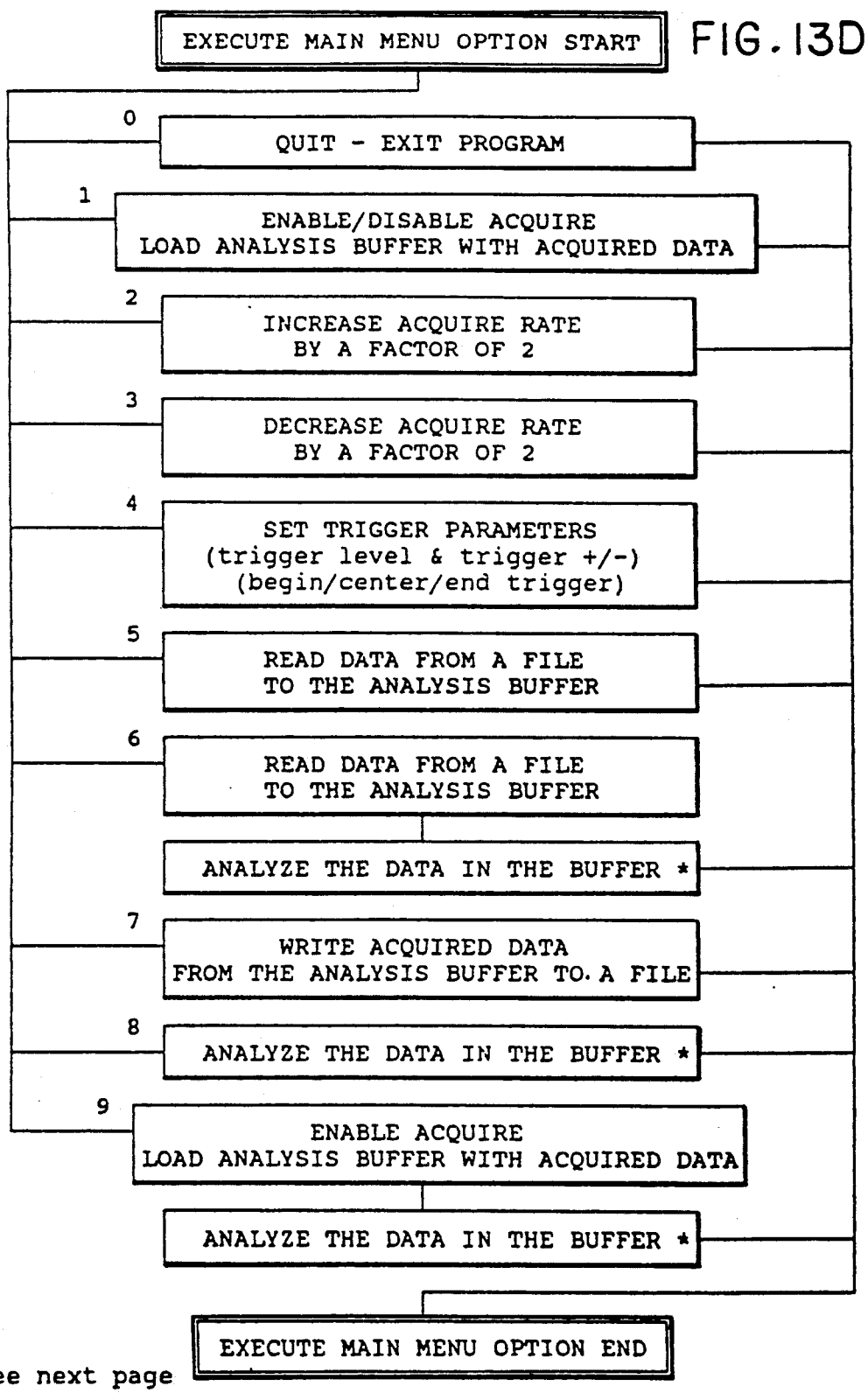
Figure 13E:
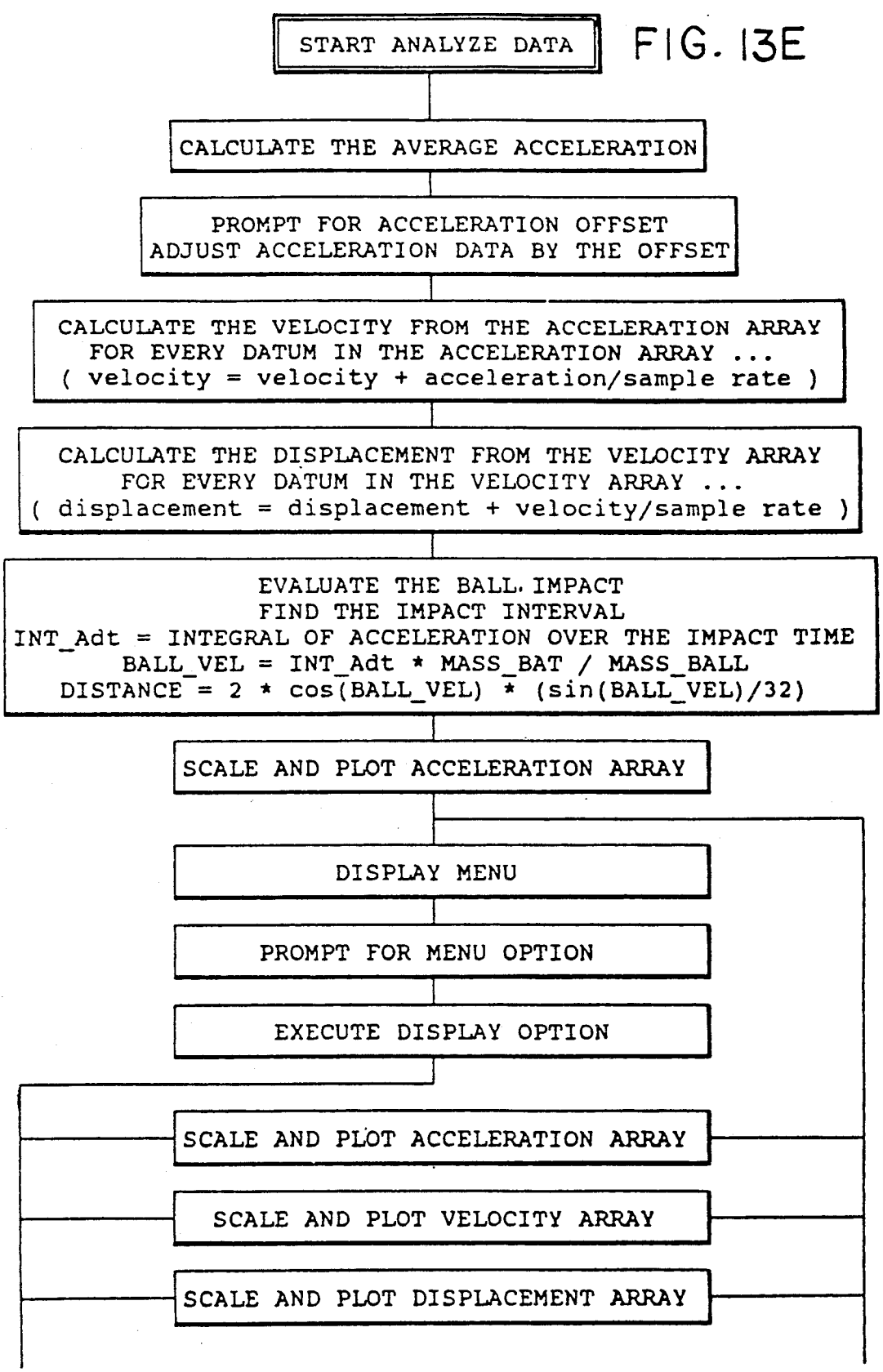
Figure 13F:
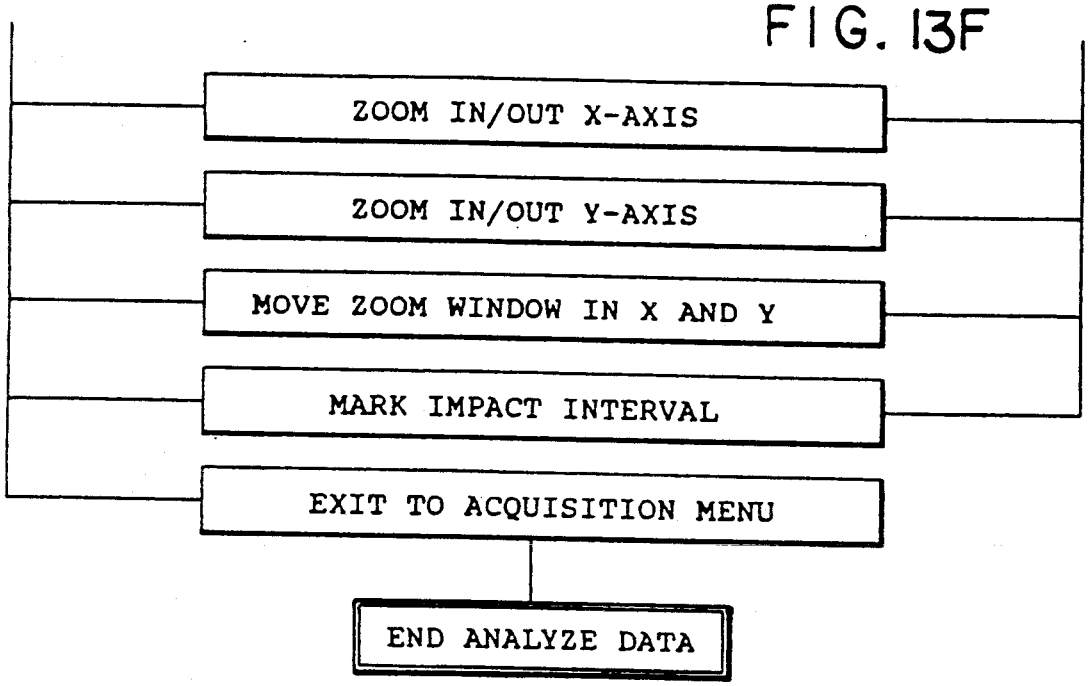

The computer provides all the functions and outputs described above. A flow chart of the pre-stored computer programs utilized in the present invention are set out in FIGS. 13A-13F. While the algorithms can be implemented by those skilled in the art, it is to be appreciated that the software is divided into three separate algorithms. Initially, as shown in FIGS. 13A and 13B, the software includes a data acquisition program which feeds data into the buffered memory. The second program initiates the swing analyzer program. After an operator selection is made, one of ten options shown in FIG. 13D is executed when the data in the memory is to be analyzed. The main data analysis program integrates the acceleration data to compute the velocity of the bat, and the displacement of the bat. In addition, an impact interval is determined. Finally, the acceleration array is plotted and scaled.

The display used depends on the desired application and could include graphical displays as well as digital readouts. If graphical readouts are required, the display will be an LCD or CRT. For digital readouts, the display might be LCD or LED.

Figure 14:
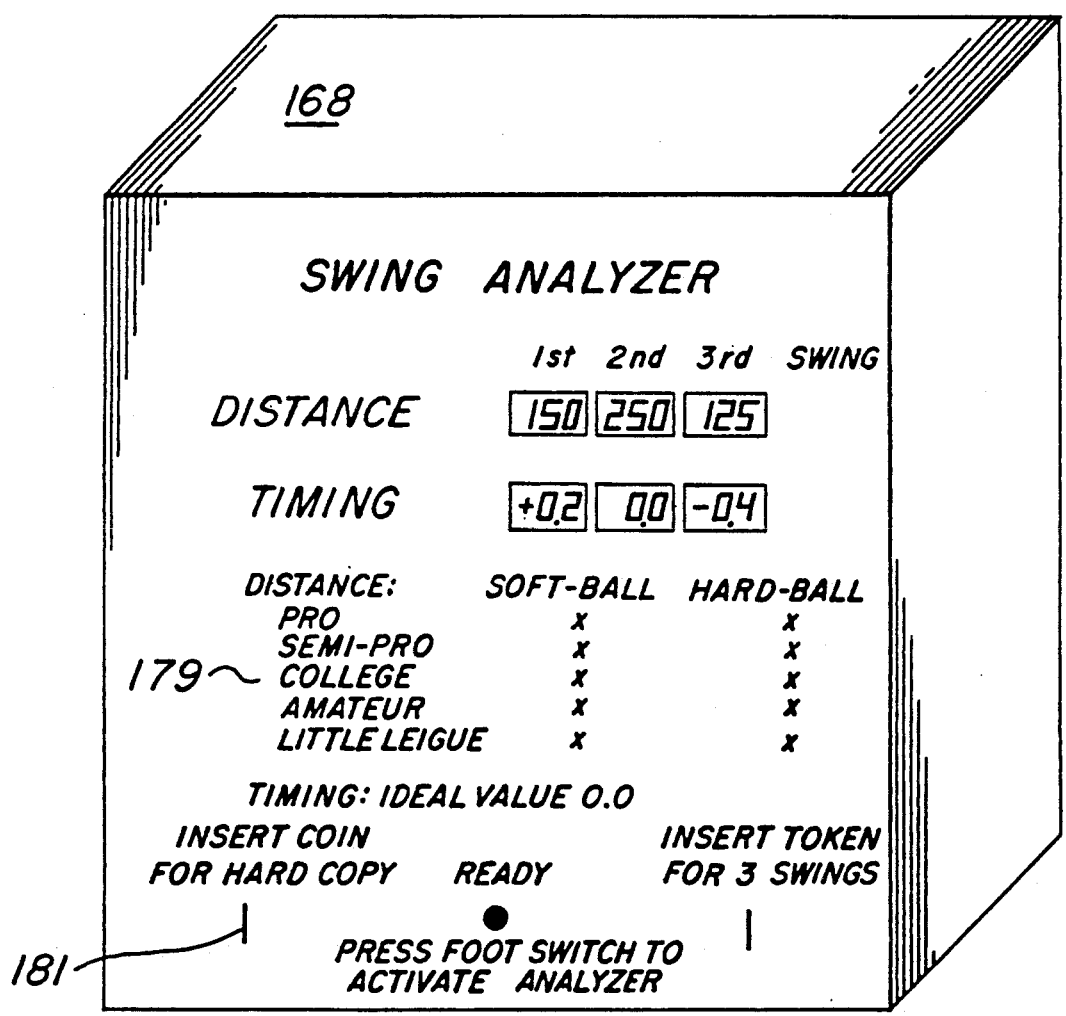
FIG. 14 illustrates a commercial application of the present invention.

Referring to FIG. 14, a commercial application of the present invention is shown. The unit 168 shown is portable and would be placed at one of the commercial batting cages which are gaining popularity throughout the U.S. and Canada. The unit contains the processing system of the present invention and may be set up to operate using the hard wired or rf transmitting configuration.

In operation, the player inserts a coin or token and is provided with a pre-set number of swings. As shown in the present example, the batter is alloted three swings for each token and the results for distance and timing data are displayed for all three swings. The unit may include a grid 179 indicating ideal performance levels for various groups of players, i.e., professional college, etc. The distance is calculated based on the area under the impact acceleration spike, assumes no air resistance and a specified initial angle of flight (e.g. 45° to the horizon). Provision may also be made for providing a hard copy readout 181.

Figure 16:
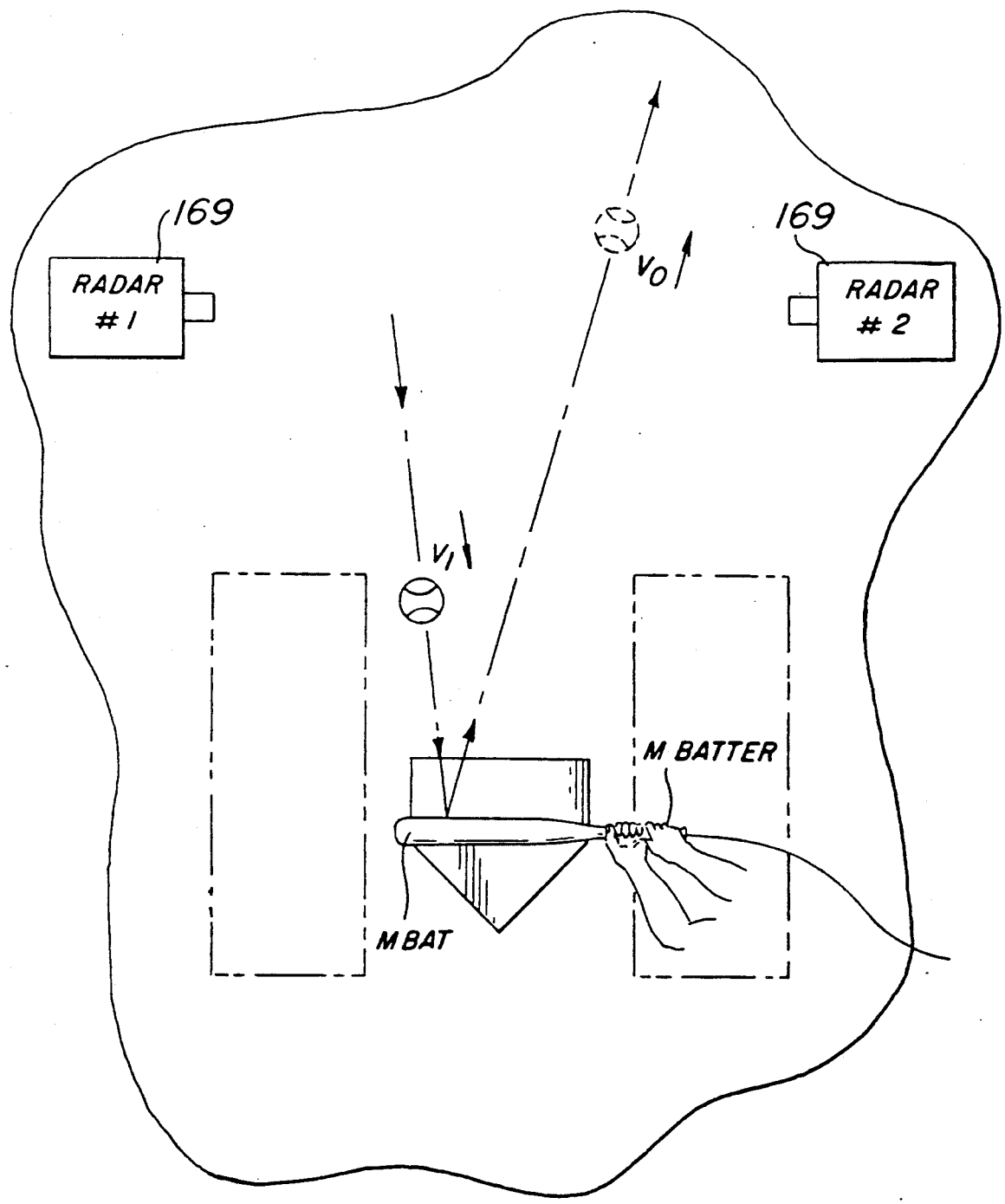
FIG. 16 is a plan view of a system which incorporates radar guns for determining the effective mass of the system.

It should be noted that the effective mass of the batter-bat system is not known because the contribution of the batter depends on his swing motion. In the absence of other data, the batter's contribution must be determined empirically. However, if as shown in FIG. 16, one or more radar guns 169 (shown symbolically) or similar apparatus are used to measure the velocity of the ball both into and out of the bat, then the batter's contribution to the effective mass ($M_{batter}$) can be determined by the application of Newton's Laws where;

$$M_{ball}(V_o + V_i) = \text{impulse} = M_{eff} \int_{t_1}^{t_2} a \, dt$$

$M_{eff}$ = effective mass of the system
$M_{eff} = M_{bat} + M_{batter}$ (where $M_{batter}$ is the contribution of the batter to mass of the system)
$V_0$ = Velocity of ball off of the bat
$V_i$ = Velocity of ball into the bat
$t_1$ = time of initial contact of bat on ball
$t_2$ = time of final contact of bat on ball The values for $V_0$ and $V_i$ are determined from the radar guns 169 and can be stored in the memory. The masses of the bat and ball are similarly predetermined, and can be prestored. The integral of acceleration over the time interval $t_1$-$t_2$ is the area under the curve in FIG. 12A between 154. Accordingly, the batter's contribution to the mass of the system can be determined algebraically by the computer. It is to be appreciated that the batter's contribution to the mass of the system is not merely a quantification of a dead mass. Rather, its empirical importance appears to lie in the fact that is it a dynamic variable which is a function of batter performance factors such as timing, wrist strength, hand position and grip.

Figure 15A:
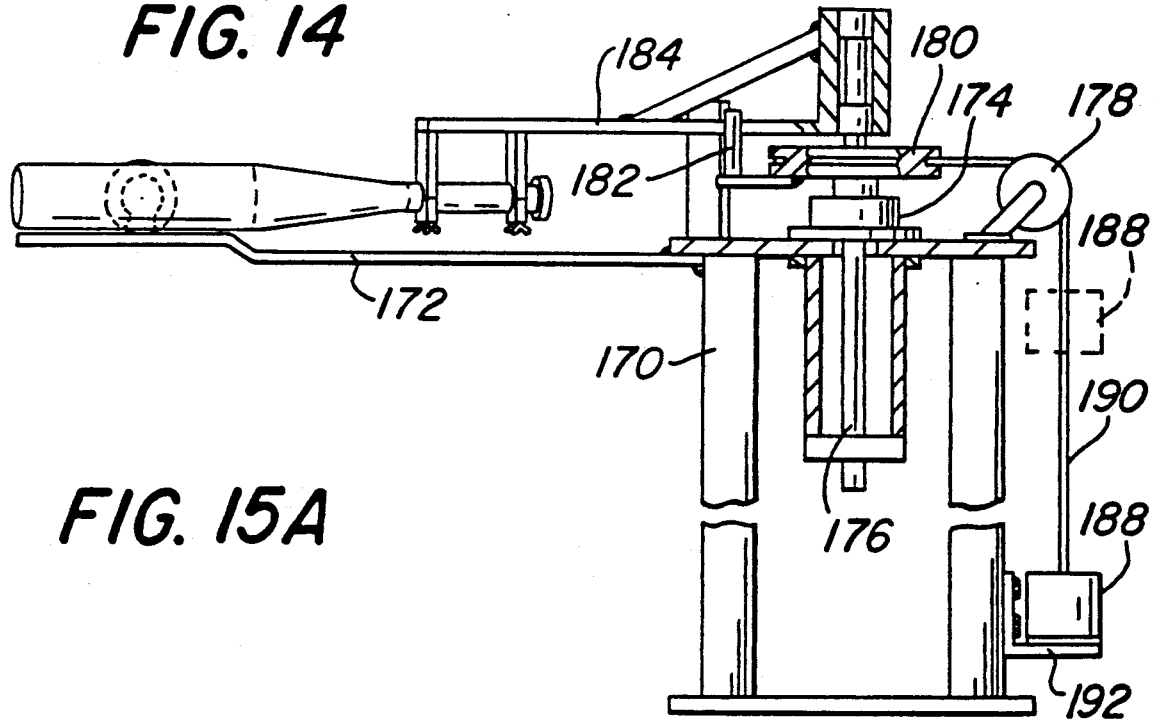
FIG. 15A illustrates a mechanism designed to reproduce a controlled swing to be utilized in conjunction with the swing analyzer of the present invention
Figure 15B:
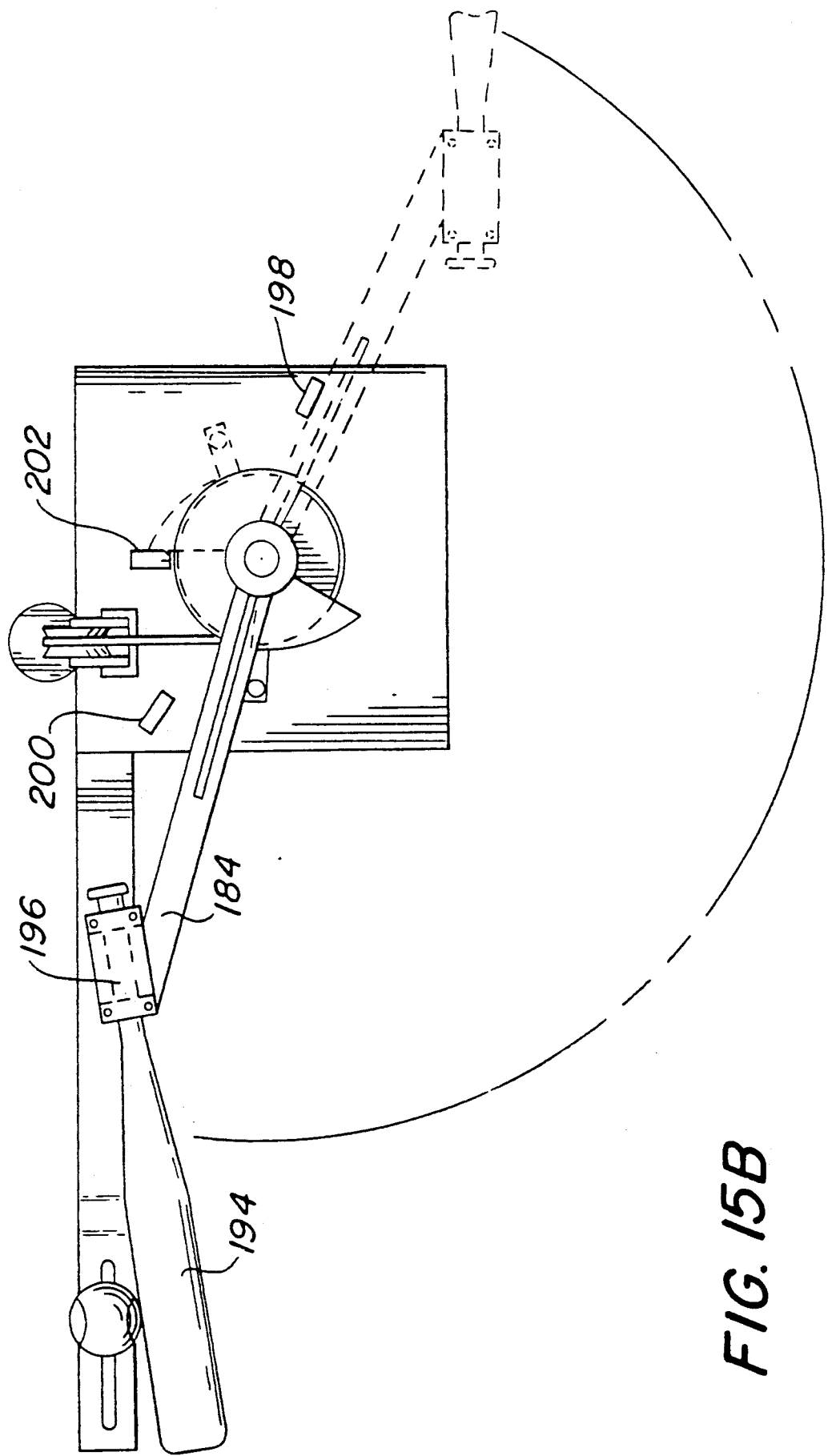
FIG. 15B is a plan view of a mechanism for reproducing a controlled swing to be utilized in conjunction with the swing analyzer of the present invention.

A final aspect of the present invention is the provision of an apparatus designed to swing a bat in a reproducible and controlled manner. The apparatus shown in FIG. 15A comprises a base 170, a ball carrier 172, a rotary bearing 174 with shaft 176, and a pulley 178. Attached to shaft 176 is driving arm 180 and attached to the driving arm is driving pin 182. A bat carrier 184 rotates around the shaft on needle bearings 186 about an arc. A weight 188 is attached to the driving arm 180 by means of flexible cable 190. An adjustable stop 192 limits the distance through which the weight may fall. FIG. 15B shows a top view of the apparatus. The bat 194 is attached to the bat carrier 184 by bat clamp 196. The rotation arc of the bat motion is limited by stops 198 and 200. The driving arm motion is limited by stop 202.

The bat velocity will be determined by the distance through which the weight falls. In use, the weight stop 192 will be set to produce a predetermined velocity and a ball will be placed on the ball carrier. The bat will be rotated back against stop 198 thereby raising weight 188 to its highest position. The bat is released and starts to rotate. The weight hits stop 192 and the bat continues to rotate. The driving pin hits stop 202 and the bat continues to rotate. The bat strikes the ball and then hits stop 200. The apparatus will produce reproducible planar swings with a preset velocity. The contact point with the ball can be varied by placing the ball in different positions on the ball carrier. The position of the ball can be varied with respect to the position along the length of the bat and also vertically to simulate an off-axis impact.

While the present invention has been described with reference to the enclosed FIGS. and embodiments, it is to be appreciated that numerous embodiments fall within the spirit and scope of the present invention, and that the true spirit and scope of the present invention is to be determined with reference to the claims appended hereto. In particular, and as repeatedly emphasized herein, while the present invention has been described in the context of a baseball bat, it is to be appreciated that the principles of the present invention are equally applicable to golfing, tennis, hockey or other sports in which an implement strikes a ball or object.

What is claimed is:

1. A swing analyzer for analyzing the swing of an implement at an object comprising:
   acceleration measurement means affixed to said implement for measuring the acceleration of said implement through a swing, including acceleration when said implement strikes said object, and for outputting a signal characteristic of said acceleration; said signal output having a peak upon said implement striking said object;
   means for transmitting said acceleration signal;
   means responsive to said transmitting means for processing said acceleration signal, said processing means providing a series of data points representing the acceleration signal characteristic;
   means to store said data points;
   means responsive to the peak of said signal output to select a predetermined number of data points before and after said peak; and
   said processing means processing said selected data points according to a prestored algorithm for translating said data points into an output characteristic of said swing.

2. A swing analyzer in accordance with claim 1 wherein said acceleration measurement means comprises means to output a first signal characteristic of the acceleration of the implement in the direction of the swing of the implement, and means to output a second signal characteristic of the acceleration of the implement in a direction opposite to the direction of the swing of the implement upon said implement striking said object, said first and second signals being transmitted by said transmitting means and processed by said processing means.

3. The swing analyzer of claim 2 wherein said implement is a sports implement.

4. The swing analyzer of claim 3 wherein said sport implement is a baseball bat.

5. The swing analyzer of claim 3 wherein said sports implement is a tennis racquet.

6. The swing analyzer of claim 3 wherein said sports implement is a softball bat.

7. The sports apparatus swing analyzer of claim 3 where said acceleration measurement means comprises a first acceleration measurement means for determining the acceleration of said implement in a first direction and a second acceleration measurement means for determining the acceleration of said implement in a second direction.

8. The sports apparatus swing analyzer of claim 3 wherein said analyzer comprises a removable module which can be affixed to any sports implement.

9. The swing analyzer of claim 2 wherein said means for transmitting said acceleration signal is a plurality of conductive wires extending out of said sports implement and connected to said processing means.

10. The swing analyzer of claim 2 wherein said means for transmitting said acceleration signal is an rf transmitter housed within said implement.

11. The swing analyzer of claim 10 wherein said rf transmitter is powered by a battery.

12. The swing analyzer of claim 11 wherein rf transmitter is controlled by a switch.

13. The swing analyzer of claim 11 where said processing means includes an antenna, demodulator and analog to digital converter.

14. The swing analyzer of claim 2 wherein said acceleration measurement means is mounted on a cantilevered spring.

15. The swing analyzer of claim 2 wherein acceleration measurement means comprises a first acceleration measurement means for measuring low levels of acceleration and a second acceleration measurement means for measuring a high level of acceleration.

16. The swing analyzer of claim 15 wherein said first acceleration measurement means is mounted on a low pass mechanical filter.

17. The swing analyzer of claim 16 wherein said low pass filter comprises an RTV compound.

18. A sports apparatus swing analyzer for use by a player to determine the effect on a thrown object by a swingable sports implement comprising:
   acceleration measurement means supported by said swingable sports implement for outputting a signal characteristic of the acceleration of said implement as it is swung by a player into and strikes an object thrown at said implement;
   means for measuring the velocity of said object as it is thrown toward said implement and for measuring the velocity of said object after it is struck by said implement;

means for transmitting said acceleration output signal into a data storage means;

processing means for determining the contribution of the player's swing motion to swing performance of said implement from said stored data based upon a prestored algorithm, and for further generating a curve characteristic of said swingable implement; and display means for displaying said curve characteristic.

19. The sports apparatus swing analyzer of claim 18 wherein said processing means further determines the contribution to the effect of the sports implement by said player.

* * * * *